United States Patent [19]

Suzuki et al.

[11] Patent Number: 5,296,944
[45] Date of Patent: Mar. 22, 1994

[54] IMAGE SCANNER AND DYNAMIC RANGE ADJUSTING METHOD THEREOF

[75] Inventors: Satoshi Suzuki, Tokyo; Susumu Takahashi, Hino; Yoshihiro Kuwata, Hino; Yasuo Morinaga, Hino, all of Japan

[73] Assignee: Iwatsu Electric Co. Ltd., Tokyo, Japan

[21] Appl. No.: 715,248

[22] Filed: Jun. 14, 1991

[30] Foreign Application Priority Data

Jun. 18, 1990 [JP] Japan ................... 2-158932

[51] Int. Cl.$^5$ .................. H04N 1/04; H04N 1/40; H04N 1/46
[52] U.S. Cl. .................. 358/475; 358/446; 358/471; 358/509
[58] Field of Search ........... 358/401, 406, 446, 461, 358/463, 471, 475, 75, 501, 504, 509

[56] References Cited

U.S. PATENT DOCUMENTS

| 4,907,077 | 3/1990 | Schulz-Hennig et al. | 358/75 |
| 4,907,078 | 3/1990 | Hasebe | 358/75 |
| 5,016,048 | 5/1991 | Watanabe | 358/474 |
| 5,034,825 | 7/1991 | Ejiri et al. | 358/475 |

FOREIGN PATENT DOCUMENTS

| 57-212864 | 12/1982 | Japan | 358/475 |
| 58-156260 | 9/1983 | Japan | 358/475 |
| 60-10872 | 1/1985 | Japan | 358/475 |
| 60-248066 | 12/1985 | Japan | 358/475 |

Primary Examiner—Edward L. Coles, Sr.
Assistant Examiner—Thomas D. Lee
Attorney, Agent, or Firm—Armstrong, Westerman, Hattori, McLeland & Naughton

[57] ABSTRACT

An image scanner is comprised of a light source for illuminating an original document, an image sensor for receiving a reflected light from the original document and converting the same into an output signal of image data, a device for relatively moving the original document and the image sensor, an iris mechanism provided on an optical path between the original document and the image sensor, a reference reflection plane provided such that a light from the light source is reflected and the reflection light becomes incident on the image sensor, a comparing circuit for comparing a level of an output signal from the image sensor with a reference level when the image sensor receives the light from the reference reflection plane, and a device for correcting a dynamic range of the image scanner by controlling the iris mechanism on the basis of the compared output.

15 Claims, 6 Drawing Sheets

IMAGE SCANNER AND DYNAMIC RANGE ADJUSTING METHOD THEREOF

BACKGROUND OF THE INVENTION

1. Field of the Invention

The present invention generally relates to image scanners and, more particularly, is directed to a method and apparatus for adjusting a dynamic range of an output signal of a solid state image sensor.

2. Description of the Related Art

In an image scanner, a light source illuminates an original document and a one-dimensional image sensor (line sensor) moves over the original document in a direction perpendicular to the length direction of the image sensor to read the original document. The light source might be a special fluorescent lamp of high brightness and the image sensor might be a one-dimensional CCD (charge-coupled device) image sensor.

Incidentally, the dynamic range of the image sensor is determined by a ratio between the maximum signal level and the minimum detected signal level. The maximum signal level is determined by the structure of the image sensor and the quantity of incident light, whereas the minimum detected signal level is influenced by various noise components generated within the image sensor. As described above, the dynamic range of the CCD image sensor has an inherent predetermined range, but the fluorescent lamp used as the light source is gradually reduced in quantity of light with a time period, resulting in the quantity of light incident on the CCD image sensor being reduced. If the quantity of light incident on the CCD image sensor is reduced, then the maximum signal level also is reduced, which unavoidably lowers the dynamic range and which increases the noise component. As a consequence, the output signal of the CCD image sensor is deteriorated in S/N (signal-to-noise) ratio.

Accordingly, if the image scanner is continuously utilized over a long period of time continuously, then the dynamic range of the image sensor (i.e., dynamic range of the output signal of the image sensor) is changed so that the image scanner cannot read the image under satisfactory conditions such as when the S/N ratio is small.

Therefore, in the image scanner, the following methods are proposed in order to adjust the dynamic range of the image sensor:

(1) To provide an AGC (automatic gain control) circuit;
(2) To control storage time of the image sensor; and
(3) To adjust the light source.

In accordance with the proposed method (1), the AGC circuit is interposed between the image sensor and an analog-to-digital (A/D) converter to thereby control the level of the signal supplied to the A/D converter so as to fall in a proper range.

According to the proposed method (2), by changing the frequency of the driving clock of the image sensor, the storage time of the image sensor is changed, thereby the dynamic range of the image sensor being adjusted.

According to the proposed method (3), the supply of voltage to the light source is turned on and off and a on-off duty ratio or on-off cycle is changed, thereby the quantity of light of the light source being adjusted.

The above methods (1)-(3), however, cannot eliminate the following shortcomings and disadvantages.

That is, according to the method (1), since the dynamic range of the image sensor is limited it is frequently observed that the image sensor cannot cope with the change of the quantity of light of the light source. Also, in the CCD image sensor, while the amount of the signal charge is reduced in proportion to the quantity of light, the amount of the noise component is reduced in proportion to the square root of the charge amount so that, when the quantity of light of the light source is reduced, then the ratio of noise contained in the output signal of the image sensor is increased. Accordingly, although a signal of proper level is supplied to the A/D converter, the signal supplied to the A/D converter is deteriorated in S/N ratio.

According to the method (2), since the hardware is limited, the frequency of the driving clock cannot be increased so much. Also, since the interface to the external devices is limited, the clock frequency cannot be decreased so much. In addition, if the clock frequency is decreased, then a dark current of the image sensor is increased, which leads to the deterioration of S/N ratio of the output signal of the image sensor.

Furthermore, according to the method (3), because a flicker occurs when the quantity of light of the light source is reduced too much, there is then a limit to reduce the quantity of light. Also, since the light source is frequently turned on and off in order to adjust the quantity of light, the life of the light source is shortened and the light source becomes unable to provide sufficient quantity of light earlier, thereby the dynamic range of the image scanner being lowered.

SUMMARY OF THE INVENTION

Accordingly, it is an object of the present invention to provide an image scanner and a method and apparatus of adjusting dynamic range of the image scanner in which the aforementioned shortcomings and disadvantages encountered with the prior art can be eliminated.

More specifically, it is an object of the present invention to provide an image scanner whose dynamic range can be adjusted.

As an aspect of the present invention, an image scanner is comprised of an iris mechanism provided on an optical path between an original document and an image sensor, a reference reflection plane provided to reflect lights from light sources so that reflected lights become incident on the image sensor and a comparator circuit for comparing a level of an output signal from the image sensor with a reference level, wherein when the image sensor receives the lights from the reference reflection plane, the level of the output signal from the image sensor is compared with the reference level by the comparator circuit and the iris mechanism is controlled on the basis of a compared output from the comparator circuit.

Before the original document is read, the reflected light from the reference reflection plane is received by the image sensor, and the level of the output signal of the received light is compared with the reference level by the comparator circuit. Then, the iris mechanism is controlled on the basis of the compared output from the comparator circuit, thereby collecting the dynamic range of the image sensor.

The above and other objects, features, and advantages of the present invention will become apparent from the following detailed description of illustrative embodiments thereof to be read in conjunction with the accompanying drawings, in which like reference numerals represent the same or similar objects.

DETAILED DESCRIPTION OF THE PREFERRED EMBODIMENTS

Figure 1:
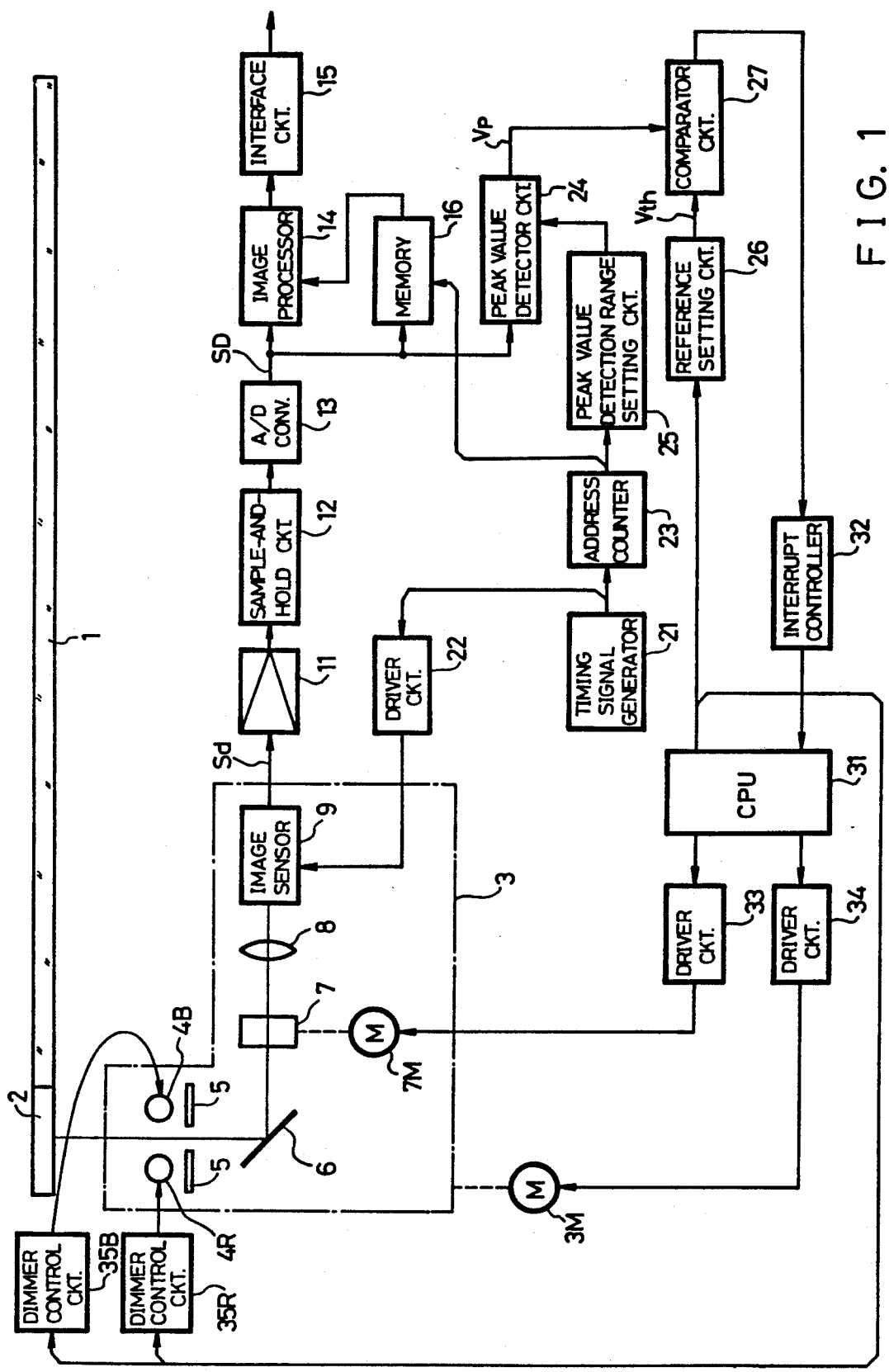
FIG. 1 is a block diagram showing an image scanner according to a first embodiment of the present invention.
Figure 2:
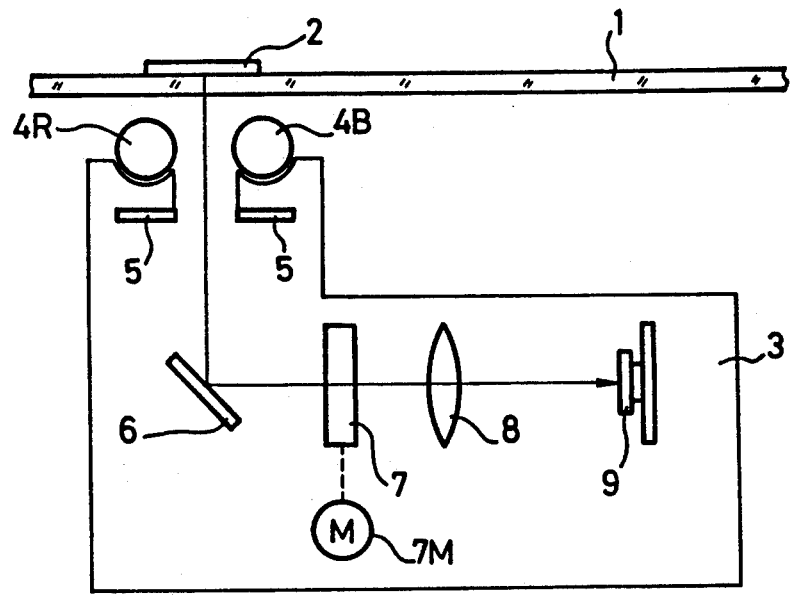
FIG. 2 is a cross-sectional view of an optical system of the image scanner of FIG. 1.
Figure 3:
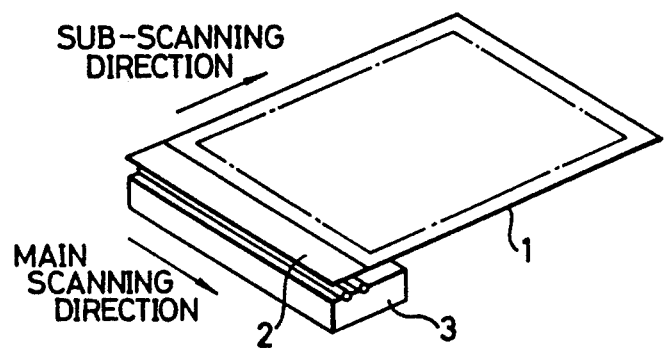
FIG. 3 is a perspective view of the optical system of the present invention.

FIG. 1 shows in block form the image scanner of the present invention, FIG. 2 shows in cross section an optical system thereof and FIG. 3 shows a perspective view thereof.

In the figures, reference numeral 1 denotes an original document table, 2 a white reference plane and 3 an optical unit. The original document table 1 is made of a transparent glass plate and has an original document reading area shown by a one-dot chain line in FIG. 3.

The white reference plane 2 is a reflector that is used as a reference plane when the quantity of light of the light source is detected. The white reference plane 2 is formed as the uniformly white plane and is placed at the position corresponding to the home position of the optical unit 3.

The optical unit 3 includes two fluorescent lamps 4R, 4B, an iris mechanism 7, a one-dimensional image sensor 9 and so on as shown in FIG. 1. The fluorescent lamps 4R, 4B produce lights of different colors, for example, red light and blue light, and these fluorescent lamps 4R, 4B are aligned in parallel such that their length directions become coincident with the main scanning direction. In this case, the reason that a plurality of light sources for producing lights of different colors are used as the light source is as follows:

If the light source is a single light source and the original document is a color original document, then a so-called drop-out color (i.e., color portion that cannot be read-out) occurs. More specifically, in the light source, the characteristic of quantity of light relative to the wavelength of the output light has a peak so that the color original document containing characters or figures of the same wavelength cannot be read out by the image sensor. For example, if the light source is the red light source and a white original document contains a red character, then the image sensor recognizes this red character portion as a white character portion and cannot recognize and read out this red character portion. That is, the color having the same wavelength as that of the light from the light source cannot be recognized by, the image sensor, which is what might be called a drop-out color.

Also, if a light source is the single light source, that particular color in the color original document cannot be emphasized or weakened. Further, the light source has a bar-shaped configuration so that, if the original document has a patching, then the patching is reproduced on the image as a shadow. To improve these shortcomings, a plurality of light sources are provided in this embodiment.

Referring back to FIG. 1, the iris mechanism 7 is adapted to adjust the quantity of a read-out light supplied to an image sensor 9 and driven by a drive motor 7M. In this embodiment, the image sensor 9 is the CCD image sensor and located in parallel to the two fluorescent lamps 4R, 4B. In FIG. 1, reference numeral 5 denotes a flare-preventing slit, 6 a reflection mirror and 8 a lens.

The optical unit 3 is moved by a drive motor 3M in the sub-scanning direction, that is, in the direction perpendicular to the fluorescent lamps 4R, 4B and to the length direction of the image sensor 9 when the original document is read out.

Figure 4:
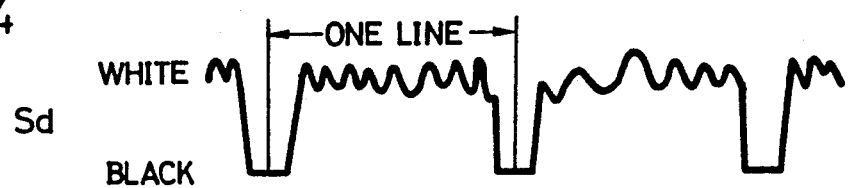
FIGS. 4 and 5 are waveform diagrams, respectively, used to explain operation of the image scanner according to the present invention.

When the original document is read, the supply of voltage to the fluorescent lamps 4R, 4B is controlled by dimmer control circuits 35R, 35B, and the original document (not shown) on the original document table 1 is illuminated with lights from the fluorescent lamps 4R, 4B. A reflected light from the original document is supplied to the image sensor 9 via the optical path formed of the spacing between the fluorescent lamps 4R, 4B, the spacing between the slits 5, 5, the reflection mirror 6, the iris mechanism 7 and the lens 8, in that order, and converted into a data signal Sd of image data by the image sensor 9. Thus, the image sensor 9 derives the data signal Sd of image data at every line as, for example, shown in FIG. 4.

The data signal Sd is supplied through an amplifier 11 and a sample-and-hold circuit 12 to an A/D converter 13, thereby converted into a digital data signal SD. The digital data signal SD is supplied to an image processor 14, in which it undergoes necessary processing, such as dot-processing and a shading correction, and output through an interface circuit 15 to a host device (not shown).

A timing signal generator 21 generates pulses of various frequencies and timings, and the driving clock also is supplied to the image sensor 9 from the timing signal generator 21 through a driver circuit 22.

Figure 5:
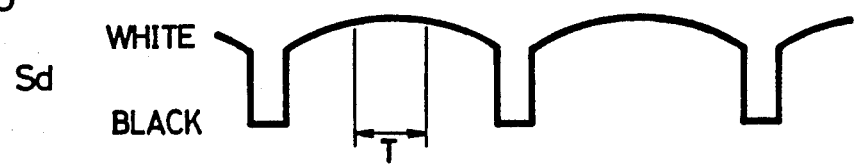

In FIG. 1, reference numeral 24 designates a peak value detector circuit and 25 a peak value detection range setting circuit. The peak value detector circuit 24 detects the white side peak value of the data signal SD and derives a detected peak value as a signal Vp. The peak value detection range setting circuit 25 is provided for the following purpose:

That is, due to optical characteristics of the fluorescent lamps 4R, 4B and the lens 8, the quantity of incident light is reduced at the respective ends of the image sensor 9. Thus, even when the image sensor 9 reads out the white reference plane 2, a shading in which the level of the data signal SD is lowered in the respective ends of the line occurs as shown in FIG. 5. Further, depending upon the original document, the original document must be trimmed if the image sensor 9 reads out characters or pictures from the original document at its end near the main scanning side. For this reason, the peak value detection range setting circuit 25 is needed to set a proper peak value detection range T in one line period (one main scanning period) when the peak value detector circuit 24 detects the peak value, as shown in FIG. 5.

Reference numeral 26 denotes a reference setting circuit, 27 a comparator circuit, 31 a microcomputer (central processing unit (CPU)) for controlling operation of the entirety of this image scanner and 32 an interrupt controller.

A pulse from the timing signal generator circuit 21 is supplied to an address counter 23 and the address counter 23 derives an address signal whose value is changed in response to the main scanning position of the image sensor 9. The address signal from the address counter 23 is supplied to the peak value detection range setting circuit 25 and a range signal whose value corresponds to the setting range T is supplied to the peak value detection range setting circuit 25 from the microcomputer 31.

Thus, the peak value detection range setting circuit 25 derives an output signal which goes high "1" level when the value of the address signal from the address counter 23 falls within a range of value indicated by the range signal from the microcomputer 31. This output signal is supplied to the peak value detector circuit 24 as a detection enable signal so that the peak value detector circuit 24 is allowed to detect the peak value only during the range T.

The detected signal Vp from the peak value detector circuit 24 is supplied to the comparator circuit 27 and a reference value Vth for comparison also is supplied to the comparator circuit 27 through the reference setting circuit 26 from the microcomputer 31. A compared output from the comparator circuit 27 is supplied through the interrupt controller 32 to the microcomputer 31 as an interrupt signal. Accordingly, when Vp≧Vth, an interrupt occurs in the microcomputer 31. In this case, the reference value Vth is selected to be the level which corresponds, for example, to 70 to 80% of the highest brightness.

Figure 6:
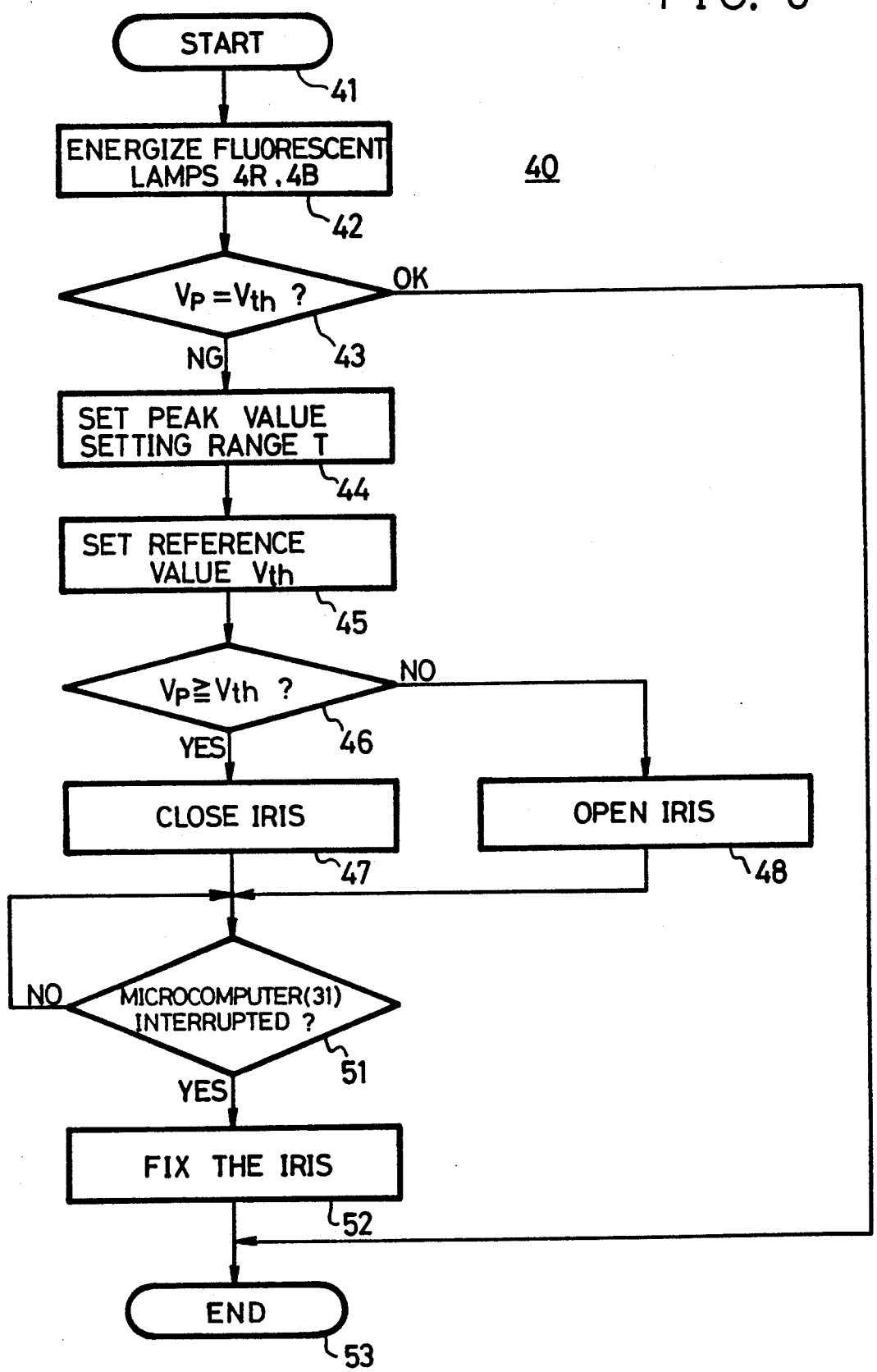
FIGS. 6 through 8 are respectively flowcharts to which references will be made in explaining operation of the present invention.

Then, the microcomputer 31 executes a routine 40 of a flowchart forming, for example, FIG. 6 to thereby correct the dynamic range.

Referring to FIG. 6, the processing of the microcomputer 31 begins with step 41 and proceeds to step 42, whereat the motor 3M is driven by the driver circuit 34 and the optical unit 3 is driven by the motor 3M, thereby moved to its home position. Also, in step 42, the fluorescent lamps 4R, 4B are energized and the data signal SD relative to the white reference plane 2 is output from the A/D converter 13.

Then, the processing of the microcomputer 31 proceeds to the next decision step 43, whereat the peak value Vp of the data signal SD is compared with the reference value Vth. If Vp=Vth or if Vp is a proper value as represented by an OK at decision step 43, then the processing proceeds from step 43 to step 53 and the routine 40 is ended.

If Vp is not equal to Vth or if Vp is not a proper value as represented by an NG at decision step 43, then the processing proceeds from step 43 to step 44. In step 44, the peak value setting range T is set by the peak value detection range setting circuit 25, and the processing proceeds to step 45, whereat the reference value Vth is set.

The processing proceeds to the next decision step 46, whereat the peak value Vp of the data signal SD is compared with the reference value Vth. If Vp≧Vth, then the processing proceeds from step 46 to step 47, wherein the microcomputer 31 energizes the motor 7M through the driver circuit 33 to gradually close the iris of the iris mechanism 7.

During this period, the processing of the microcomputer 31 proceeds from step 47 to the next decision step 51. It is determined in decision step 51 whether or not the microcomputer 31 is interrupted by the compared output of the comparator circuit 27. If a NO is output at step 51, then the step 51 is repeated.

However, in that case, since the iris of the iris mechanism 7 is being closed gradually at step 47, the peak value Vp of the data signal SD is gradually reduced accordingly. If the iris of the iris mechanism 7 is closed to a certain iris value, then an equality of Vp=Vth is satisfied so that the microcomputer 31 is interrupted by the compared output of the comparator circuit 27. If the microcomputer 31 is interrupted as represented by a YES at step 51, then the processing proceeds from step 51 to step 52, whereat the motor 7M is disabled through the driver circuit 33 by the microcomputer 31, whereby the iris of the iris mechanism 7 is fixed to the iris value determined when the interrupt occurs in the microcomputer 31. Then, the routine 40 is ended with step 53.

If on the other hand Vp is smaller than Vth (VP<Vth) as represented by a NO at step 46, then the processing proceeds from step 46 to step 48, whereat the microcomputer 31 energizes the motor 7M through the driver circuit 33 to thereby gradually open the iris of the iris mechanism 7. During this period, the processing of the microcomputer 31 proceeds from step 48 to decision step 51. Therefore, similarly to the case that Vp≧Vth is satisfied, the iris of the iris mechanism 7 is continuously opened until Vp becomes equal to Vth. If Vp=Vth, then the microcomputer 31 is interrupted by the compared output of the comparator circuit 27 and the iris of the iris mechanism 7 is fixed to the iris value determined when the microcomputer 31 is interrupted. Then, the routine 40 is ended.

Thereafter, the data signal SD provided when the image sensor 9 receives the light from the white reference plane 2 is stored in a memory 16 as data indicative of the shading condition. Subsequently, the motor 3M is driven via the driver circuit 34 to thereby move the optical unit 3 in the sub-scanning direction.

Therefore, as described above, the image sensor 9 derives the data signal SD of the image data of the original document, and the data signal SD is processed by the image processor 14 and fed through the interface circuit 15 to the host device (not shown). At that time, the shading data stored in the memory 16 is supplied to the image processor 14 which then correct the shading.

As described above, when the routine 40 is executed, the iris value of the iris mechanism 7 is set such that the quantity of light of the fluorescent lamps 4R, 4B may be corrected. Therefore, so long as the quantity of light of the fluorescent lamps 4R, 4B is not lowered extremely, the reflected light whose quantity of light is suitable for the dynamic range of the image sensor 9 is supplied to the image sensor 9 from the original document.

Figure 7:
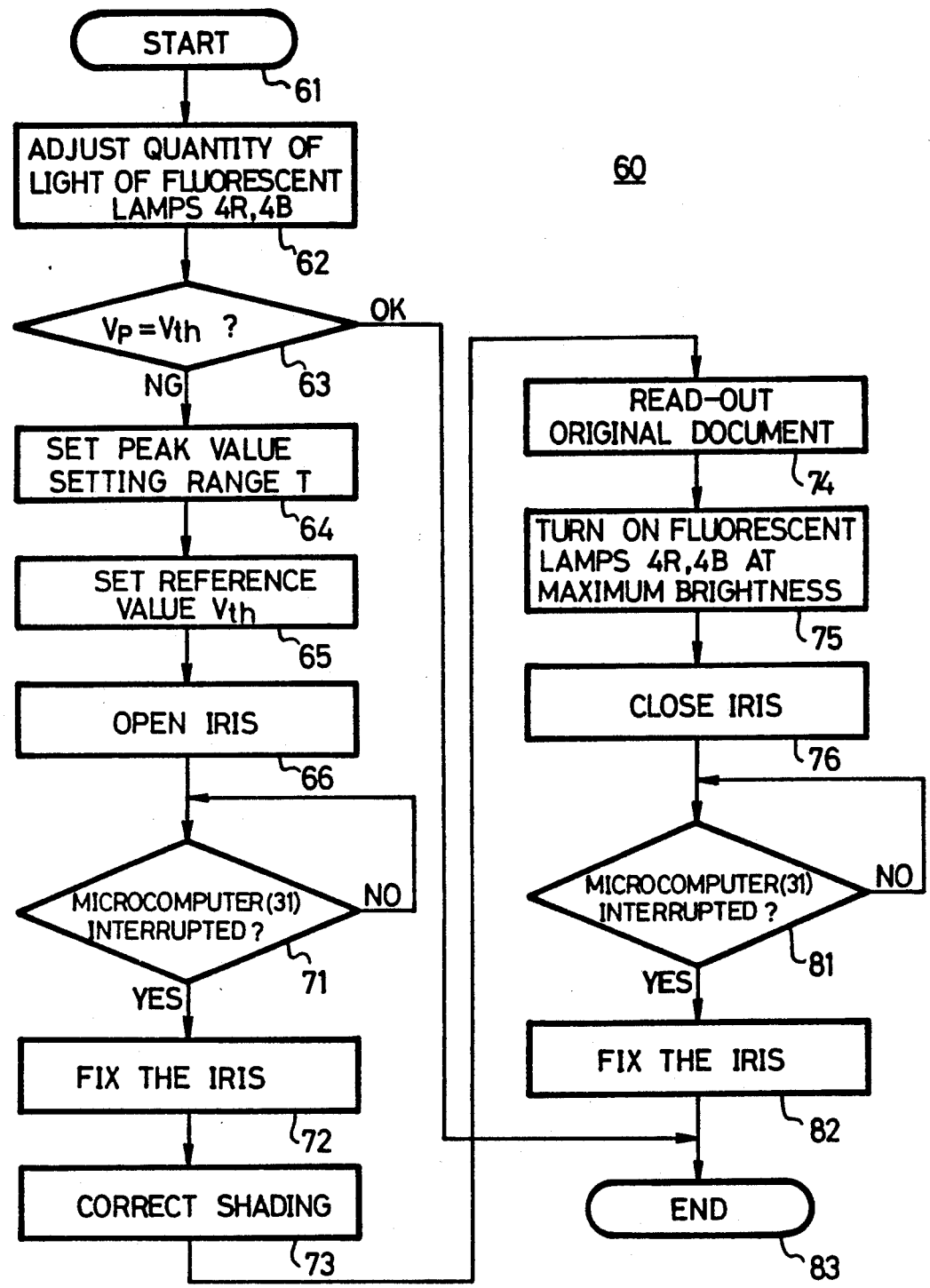

A routine 60 of FIG. 7 shows another example of the routine for correcting the dynamic range of the image sensor 9.

Referring to FIG. 7, the routine 60 begins with step 61. In step 62, under the condition that the optical unit 3 is placed at the home position thereof, the microcomputer 31 controls the dimmer control circuits 35R, 35B so that the quantities of light of the fluorescent lamps 4R, 4B may fall in a predetermined ratio. For example, when red data is shifted to the white side and when blue data is shifted to the black side, the ratio of red:blue is set to 2:1. Conversely, when red data is shifted to the black side and when blue data is shifted to the white side, the ratio of red:blue is set to 1:2.

In the next decision step 63, by checking the occurrence of interrupt, the peak value Vp of the data signal SD is compared with the reference value Vth. If Vp=Vth or if the peak value of the data signal SD is a proper value as represented by an OK, then the processing proceeds from step 63 to step 83, whereat the routine 60 is ended.

If Vp<Vth, then the processing proceeds from step 63 to step 64. At step 64, the peak value setting range T is set by the peak value detection range setting circuit 25, and the processing proceeds to step 65, whereat the reference value Vth is set.

In the next step 66, the microcomputer 31 supplies the drive start signal of the motor 7M through the driver circuit 33 to the motor 7M so that the motor 7M is driven to open the iris of the iris mechanism 7 gradually.

During this period, the processing of the microcomputer 31 proceeds from step 66 to the next decision step 71. It is determined in decision step 71 whether or not the microcomputer 31 is interrupted by the compared output of the comparator circuit 27. If not, then decision step 71 is repeated.

In that event, since the iris of the iris mechanism 7 is being gradually opened in step 66, the peak value Vp of the data signal SD is gradually increased accordingly. When the iris of the iris mechanism 7 is opened to a certain iris value, then the equality of Vp=Vth is satisfied so that the microcomputer 31 is interrupted by the compared output of the comparator circuit 27 under the control of the interrupt controller 32.

Then, the occurrence of the interrupt is detected at step 71, and the processing proceeds from step 71 to step 72, whereat the motor 7M is disabled by the microcomputer 31 through the driver circuit 33, thereby the iris of the iris mechanism 7 being fixed to that iris value.

In the next step 73, the data signal SD is stored in the memory 16 as shading correction data, and the processing proceeds to step 74, whereat the microcomputer 31 energizes the motor 3M through the driver circuit 34 to thereby move the optical unit 3 in the sub-scanning direction.

As described above, the image sensor 9 derives the data signal SD of the image data of the original document and this data signal SD is processed by the image processor 14 in a predetermined manner, which is fed through the interface circuit 15 to the host device (not shown).

At that time, the shading data stored in the memory 16 is supplied to the image processor 14, in which the shading is corrected. Also, when the reading of the original document is finished, then the optical unit 3 is returned to the home position thereof.

In the next step 75, under the control of the dimmer control circuits 35R, 35B, the fluorescent lamps 4R, 4B are turned on at the maximum brightness (duty ratio of 100%), and the processing proceeds to the next step 76, whereat the microcomputer 31 energizes the motor 7M through the driver circuit 33 to thereby close the iris of the iris mechanism 7 gradually.

During this period, the processing of the microcomputer 31 proceeds from step 76 to the next decision step 81, whereat it is determined whether or not the microcomputer 31 is interrupted by the compared output of the comparator circuit 27 through the interrupt controller 32. If not, then the step 81 is repeated.

In that case, however, since the iris of the iris mechanism 7 is being closed gradually in step 76, the peak value Vp of the data signal SD is gradually decreased accordingly. When the iris of the iris mechanism 7 is closed to a certain iris value, then the equality of Vp=Vth is satisfied so that the microcomputer 31 is interrupted by the compared output of the comparator circuit 27 through the interrupt controller 32. Then, the occurrence of the interrupt is detected at step 81, and the processing proceeds from step 81 to step 82, whereat the microcomputer 31 supplies a drive disable signal of the motor 7M through the driver circuit 33 to the motor 7M, thereby the iris of the iris mechanism 7 being fixed to that iris value. Then, the routine 60 is ended with step 83.

Therefore, according to the routine 60 of FIG. 7, since the ratio of quantities of light of the fluorescent lamps 4R, 4B is adjusted at step 62, it is possible to prevent the drop-out color from being produced in the color original document. Also, particular color of the color original document can be emphasized or weakened upon reading.

Furthermore, after the original document is read, the fluorescent lamps 4R, 4B are turned on at the maximum brightness in step 75, or the fluorescent lamps 4R, 4B are not energized in the on-off control fashion so that the life of the fluorescent lamps 4R, 4B can be prolonged.

The step 62 of the routine 60 will be described more fully with reference to a routine 90 in a flowchart of FIG. 8.

Figure 8:
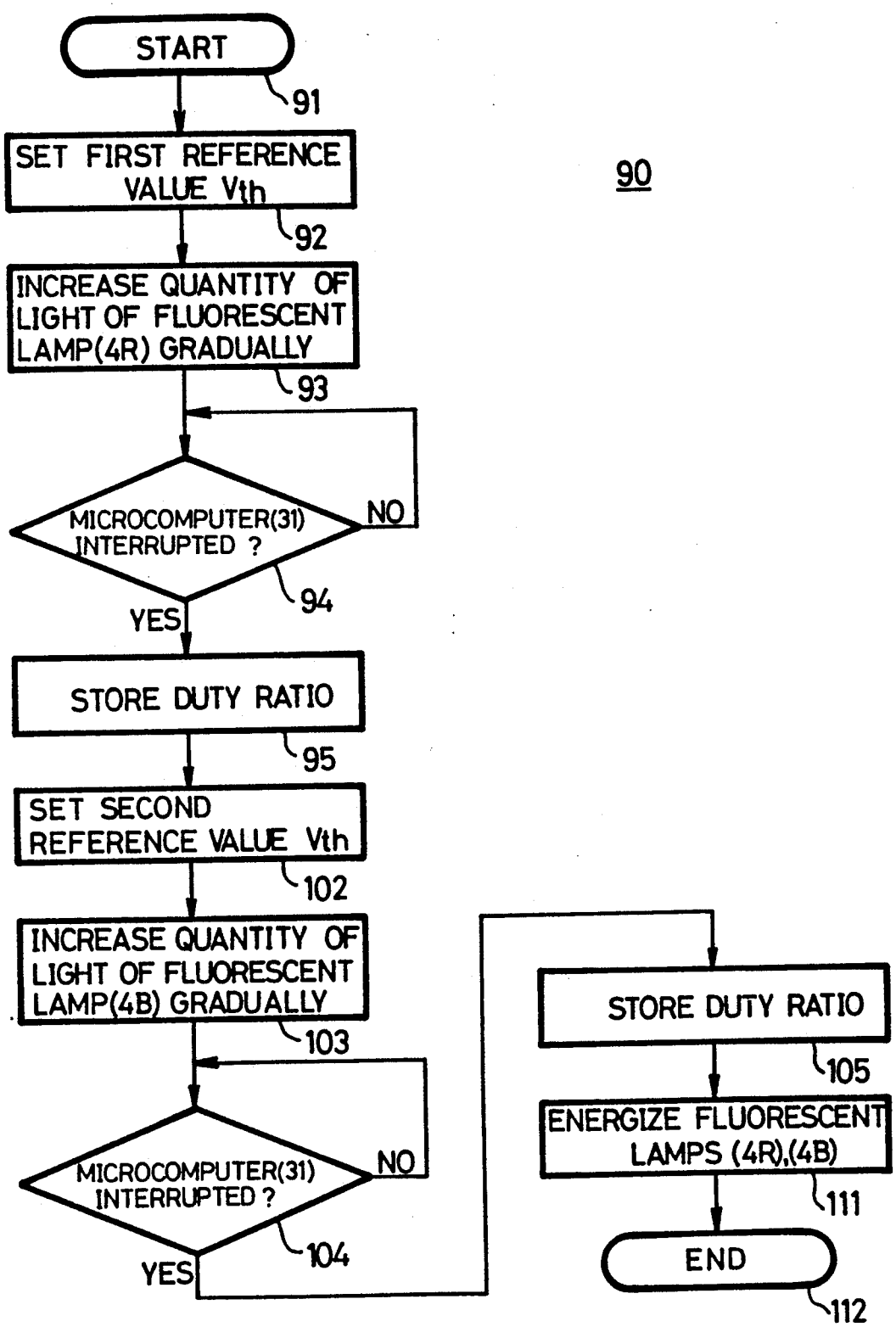

Referring to FIG. 8, the processing of the microcomputer 31 begins with step 91 and the processing proceeds to the next step 92, whereat a first reference value Vth for the fluorescent lamp 4R is set. In the next step 93, the optical unit 3 is placed at the home position thereof and only the fluorescent lamp 4R is turned on.

In this case, however, the dimmer control circuit 35R is controlled by the microcomputer 31 so that the on-off duty ratio of the supply of voltage to the fluorescent lamp 4R is gradually increased from 0 to 100%, accordingly, the quantity of light of the fluorescent lamp 4R is gradually increased from 0.

During this period, the processing of the microcomputer 31 proceeds from step 93 to the next decision step 94, whereat it is determined whether or not the microcomputer 31 is interrupted by the compared output of the comparator circuit 27 through the interrupt controller 32. If a NO is output at decision step 94, then the step 94 is repeated. In that case, since the quantity of light of the fluorescent lamp 4R is gradually increased in step 93, the peak value Vp of the data signal SD is gradually increased accordingly. When the quantity of light of the fluorescent lamp 4R is reached to a certain value, the equality of Vp=Vth is satisfied so that the microcomputer 31 is interrupted by the compared output of the comparator 27 through the interrupt controller 32. Then, the occurrence of this interrupt is detected at decision step 94, and the processing proceeds to step 95, whereat the duty ratio of voltage supplied to the fluorescent lamp 4R is stored in the memory 16. Also, the fluorescent lamp 4R is turned off temporarily.

Then, the processing proceeds to step 102, and throughout steps 102 to 105, the fluorescent lamp 4B undergoes similar processing from step 92 to step 95. When Vp=Vth is established, then duty ratio of voltage supplied to the fluorescent lamp 4B is stored in the memory 16.

Then, the processing proceeds to the next step 111, whereat the fluorescent lamp 4R is turned on at the duty ratio stored in the memory 16 at step 95 and the fluorescent lamp 4B is turned on at the duty ratio stored in the memory 16 at step 105. Then, the routine 90 ends with step 112.

Therefore, according to the routine 90, the fluorescent lamps 4R and 4B are turned on in respective predetermined quantity of light so that the original document can be read so as not to cause the drop-out color while emphasizing or weakening particular color.

Figure 9:
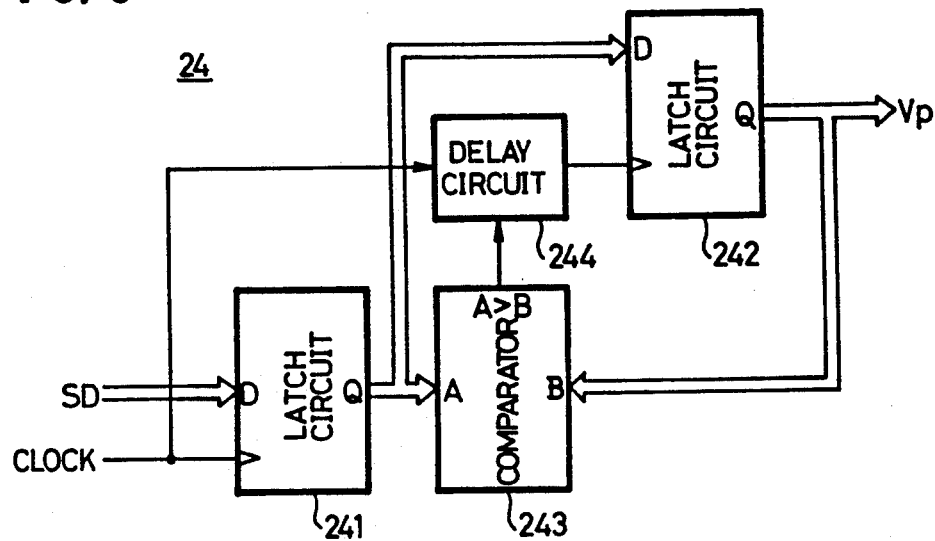
FIGS. 9 and 10 are block diagrams showing main portions of a second embodiment of the present invention.

FIG. 9 shows an example of the peak value detecting circuit 24. As shown in FIG. 9, the peak value detecting circuit 24 is composed of a latch circuit 241 which latches the present data signal SD, a latch circuit 242 which latches the accumulated peak values and a digital comparator 243.

As shown in FIG. 9, the data signal SD from the A/D converter 13 is latched in the latch circuit 241 by the pixel clock and, these (accumulated) peak values latched in the latch circuit 242 are compared with the data signal SD by the comparator 243.

If it is determined by this comparison that the value of the latch circuit 241 is larger than the value of the latch circuit 242, then the digital comparator 243 derives an output and in response to this output, the pixel clock is supplied through the delay circuit 244 to the latch circuit 242 as a latch pulse.

Accordingly, the value of the latch circuit 241 is newly latched in the latch circuit 242, that is, the latch circuit 242 derives the peak value Vp of the data signal SD.

Figure 10:
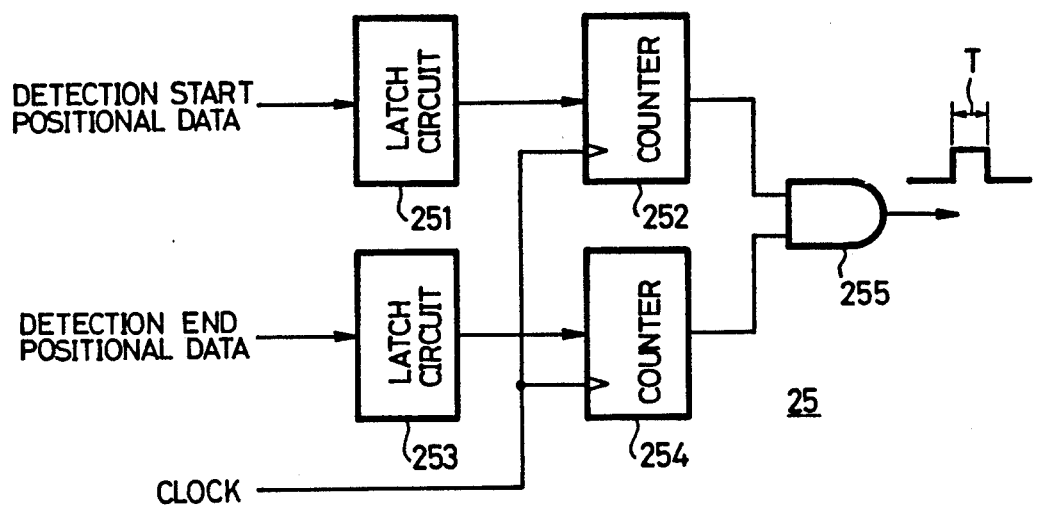

Further, FIG. 10 shows an example of the peak value detection range setting circuit 25. More specifically, position data corresponding to the starting time point of the range T is supplied from the microcomputer 31 through a latch circuit 251 to a counter 252 and, the pixel clock is supplied to the counter 252 as a count input. The counter 252 derives a signal which goes high "1" level from the starting time point of the range T. This output is supplied to an AND circuit 255.

Position data corresponding to the ending time point of the range T is supplied from the microcomputer 31 through a latch circuit 253 to a counter 254 and, the pixel clock is supplied to the counter 254 as the count input so that the counter 254 derives a signal which goes high "1" level until the ending time point of the range T. This output signal is supplied to the AND circuit 255.

Thus, the AND circuit 255 derives a range setting signal which goes high "1" level in the range T.

While the fluorescent lamps 4R and 4B for producing red and blue lights are used as described above, a fluorescent lamp which produces light of other color, for example, green light may also be utilized.

Further, immediately after the reading of the original document is ended in step 74 of the routine 60 shown in FIG. 7, the fluorescent lamps 4R and 4B may be turned on at the maximum brightness and then the optical unit 3 may be returned to the home position thereof.

In order to store duty ratios of the dimmer control circuits 35R, 35B in the memory 16 when the microcomputer 31 is interrupted by the compared output from the comparator circuit 27 under the control of the interrupt controller 32, the pulse train whose duty ratio is changed from 0 to 100% is supplied from the microcomputer 31 to the dimmer control circuits 35R, 35B so that, when the interrupt occurs in the microcomputer 31, the resultant duty ratios may be stored in the memory 16. Alternatively, a counter is provided so that, when a command signal is supplied from the microcomputer 31 to the counter, the counter automatically counts up data to thereby change the duty ratios. Also, the value presented when the interrupt occurs in the microcomputer 31 may be latched and stored.

As described above, according to this invention, since the quantity of light of data light supplied to the image sensor from the original document is controlled by the iris mechanism, regardless of the limit of the dynamic range of the image sensor itself, the image sensor can cope with the change of the quantity of light of the light source.

Since the quantity of light supplied to the image sensor is corrected to be the optimum value, the ratio of noise components contained in the output data signal of the image sensor can be prevented from being increased, which therefore prevents the S/N ratio of the data signal from being deteriorated.

Further, since the frequency of the drive clock of the image sensor is constant, the hardware of the image scanner can be prevented from being restricted and also the interface to the external device can be prevented from being restricted. Further, since the clock frequency need not be lowered, it is possible to avoid the disadvantage such that the dark current of the image sensor is increased to deteriorate the S/N ratio of the output data signal.

Further, since the quantity of light of the light source need not be decreased so extremely, the occurrence flicker can be avoided.

Furthermore, when a plurality of light sources which produce lights of different colors are utilized, the drop-out color can be prevented from being produced in the color original document. Also, it is possible to emphasize or weaken particular color on the color original document by varying the ratio of the quantities of light of the plurality of light sources.

In addition, the original document is illuminated with a plurality of light sources so that, even when the original document has any patching, a shadow can be prevented from being produced in the image.

Having described the preferred embodiments of the invention with reference to the accompanying drawings, it is to be understood that the invention is not limited to those precise embodiments and that various changes and modifications thereof could be effected by one skilled in the art without departing from the spirit or scope of the invention as defined in the appended claims.

What is claimed is:

1. An image scanner comprising:
   a plurality of light sources for illuminating an original document with lights of different colors;
   an image sensor consisting of a line sensor for receiving a reflected light from said original document and converting the same into an output signal of image data;
   means for moving said image sensor relative to said original document, wherein said means for moving said image sensor consists of a mechanism which moves said image sensor in the direction parallel to the length direction of said original document;
   an iris mechanism provided on an optical path between said original document and said image sensor;

a reference reflection plane provided such that a light from said plurality of light sources is reflected and a reflected light becomes incident on said image sensor;

a comparing circuit for comparing a level of an output signal from said image sensor with a reference level when said image sensor receives the light from said reference reflection plane; and means for correcting a dynamic range of said image scanner by controlling said iris mechanism on the basis of the compared output, wherein said original document is read under the condition such that a ratio of the quantities of light is set to be a predetermined value by turning on and off said plurality of light sources according to predetermined duty ratios and said plurality of light sources are turned on in full power after the reading of said original document is ended.

2. An image scanner comprising:

a light source for illuminating an original document;

an image sensor for receiving a reflected light from said original document and converting the same into an output signal of image data;

means for moving said image sensor relative to original document;

an iris mechanism provided on an optical path between said original document and said image sensor;

a reference reflection plane provided such that a light from said light source is reflected and a reflected light becomes incident on said image sensor;

light adjusting means for adjusting said light source by controlling duty ratio of voltage supplied to said light source;

a comparing circuit for comparing a level of an output signal from said image sensor with a reference level when said image sensor receives the light from said reference reflection plane; and means for adjusting quantity of light of said light source by controlling said light adjusting means on the basis of a compared output from said comparing circuit.

3. An image scanner according to claim 2, wherein said light source is composed of a bar-shaped light source.

4. An image scanner according to claim 2, wherein said light source is formed of a fluorescent lamp.

5. An image scanner comprising:

a plurality of light sources for illuminating an original document with lights of different colors;

means for setting a ratio of quantities of light of said plurality of light sources to a predetermined value;

an image sensor for receiving a reflected light from said original document and converting the same into an output signal of image data;

means for moving said image sensor relative to said original document;

an iris mechanism provided on an optical path between said original document and said image sensor;

a reference reflection plane provided such that a light from said light source is reflected and a reflected light becomes incident on said image sensor;

a comparing circuit for comparing a level of an output signal from said image sensor with a reference level when said image sensor receives the light from said reference reflection plane; and means for correcting a dynamic range of said image scanner by controlling said iris mechanism on the basis of the compared output.

6. An image scanner comprising:

a plurality of light sources for illuminating an original document with lights of different colors;

an image sensor for receiving a reflected light from said original document and converting the same into an output signal of image data;

means for moving said image sensor relative to said original document;

an iris mechanism provided on an optical path between said original document and said image sensor;

a reference reflection plane provided such that a light from said light source is reflected and a reflected light becomes incident on said image sensor;

light adjusting means for adjusting each of said plurality of light sources by controlling a duty ratio of voltage supplied to each of said plurality of light sources;

a comparing circuit for comparing a level of an output signal from said image sensor with a reference level when said image sensor receives the light from said reference reflection plane;

means for adjusting quantity of light of said light source by controlling said light adjusting means on the basis of a compared output from said comparing circuit; and setting means for providing to set said reference level compared with an output signal of said image sensor in said comparing circuit in response to light sources of respective light colors, whereby a ratio of quantities of light from said plurality of light sources is set to be a predetermined value by varying said reference level.

7. An image scanner according to any one of claims 2, 5 or 6, wherein said image sensor is formed of a line sensor.

8. An image scanner according to claims 5 or 6, wherein said plurality of light sources are composed of a plurality of bar-shaped light sources.

9. An image scanner according to claims 2, 5 or 6, wherein said image sensor is formed of a line sensor and said means for moving said image sensor relative to said original document is a mechanism which moves said image sensor in the direction parallel to the length direction of said original document.

10. An image scanner according to claim 5 or 6, wherein said plurality of light sources are formed of fluorescent lamps which produce lights of different colors.

11. An image scanner according to any one of claims 2, 5 or 6, wherein said reference reflection plane is formed of a white reference plane.

12. An image scanner according to claim 5 or 6, further comprising means for deriving an output signal having a predetermined range, wherein said predetermined range is narrower than the whole reading range of said image sensor, in which a level of said output signal from said deriving means and said reference level are compared with said comparator circuit.

13. An image scanner according to any one of claims 2, 5 or 6, wherein said reference reflection plane is formed of a white reference plane and memory means is provided to store said image sensor output signal which results from reflecting a light from said image sensor on said white reference plane so that shading of an output signal of said image sensor upon reading said original document is corrected on the basis of data stored in said memory means.

14. An image scanner according to claim 5 or 6, wherein said original document is read under the condition such that said ratio of quantities of light of said plurality of light sources is set to be a predetermined value by turning on and off said plurality of light sources according to predetermined duty ratios and said plurality of light sources are turned on in full power after the reading of said original document is ended.

15. An image scanner according to claim 5 or 6, wherein said image sensor is automatically returned to a position at which a reflected light or said light source from said reference reflection plane is reflected after said original document is read.

* * * * *

UNITED STATES PATENT AND TRADEMARK OFFICE
CERTIFICATE OF CORRECTION

PATENT NO. : 5,296,944
DATED : March 22, 1994
INVENTOR(S) : Suzuki et al.

It is certified that error appears in the above-identified patent and that said Letters Patent is hereby corrected as shown below:

Title page,
Item [73], change "Iwatsu Electric Co., Ltd., Tokyo, Japan" to -- Iwatsu Electric Co., Ltd., and Kowa Company Ltd., of Tokyo, Japan and Nagoya-shi, Japan, respectively. --.

Signed and Sealed this

First Day of January, 2002

Attest:

JAMES E. ROGAN
Director of the United States Patent and Trademark Office

Attesting Officer